United States Patent [19]

Tagawa et al.

[11] Patent Number: 5,246,645
[45] Date of Patent: Sep. 21, 1993

[54] METHOD OF CONTROLLING INJECTION MOULDING MACHINE

[75] Inventors: Sainori Tagawa; Shinichi Tomita, both of Ube, Japan

[73] Assignee: Ube Industries, Ltd., Yamaguchi, Japan

[21] Appl. No.: 886,500

[22] Filed: May 22, 1992

[30] Foreign Application Priority Data

May 24, 1991 [JP] Japan .................................. 3-120458

[51] Int. Cl.⁵ .............................................. B29C 45/77
[52] U.S. Cl. .................................. 264/40.1; 264/40.5; 425/145; 425/149; 425/135
[58] Field of Search .................... 264/40.1, 40.5, 328.1; 425/135, 145, 146, 149

[56] References Cited

U.S. PATENT DOCUMENTS 3,860,801 1/1975 Hunkar ................................. 425/145
3,904,078 9/1975 Neff et al. ............................ 425/145

FOREIGN PATENT DOCUMENTS 53-39905 10/1978 Japan .

Primary Examiner—Jill L. Heitbrink
Attorney, Agent, or Firm—Armstrong, Westermen, Hattori, McLeland & Naughton

[57] ABSTRACT

A method of controlling an injection molding machine in which change in the forward movement velocity of an injecting screw or change in the filling pressure is detected at the time of performing switching from the filling process to the packing process, commencement of the packing control is hastened if the change in the velocity or the pressure is reversed, while the commencement of the packing process is delayed if a determined level is not realized within a predetermined time from the commencement of the packing control. When the injection molding work is performed, switching from the filling process to the packing process can be easily performed at a proper time and therefore high quality products can be easily mass-produced.

3 Claims, 5 Drawing Sheets

METHOD OF CONTROLLING INJECTION MOULDING MACHINE

BACKGROUND OF THE INVENTION

1. Field of the Invention

The present invention relates to injection control for an injection molding machine, and, more particularly, to control of switching from the filling process to the packing process.

In these days, a molten resin or the like is injection-molded as shown in FIG. 4 which is a graph, the axis of the abscissa referring to position l or time t and the axis of ordinate referring to the forward movement velocity V cf the injection screw and pressure P. As shown in FIG. 4, the injection molding process is composed of a filling process L1 in which a mold cavity is filled with a molten resin at high speed and a packing process L2 in which pressure is applied after the mold cavity has been filled with the molten resin so as to form a desired shape. Generally, in the filling process L1, the pressure regulating valve of the hydraulic pressure circuit is fully opened to a large degree, and setting is so made that the degree of opening of a flow rate control valve is changed with predetermined position and time. This is done so as to change the velocity to one or more steps while making the lapse of predetermined position and time from the moment at which the injection has been started or the forward movement position of the injection screw or the like as the reference. Furthermore, the flow rate control valve is adjusted so as to control the piston of the injection cylinder and thereby control the forward movement velocity of the injection screw or the like. As a result, the cavity is filled with the molten resin at a high velocity at which the resin in the cavity does not contain air. The aforesaid packing process L2 is arranged in such a way that the state in which the flow rate control valve is opened in a condition whereby the operation of the pressure regulating valve is operable is fixed after the cavity has been filled with the molten resin and the hydraulic pressure is adjusted by the pressure regulating valve. In this packing process L2, the degree of opening of the pressure regulating valve is changed so that a predetermined pressure is applied to the molten resin which has filled the cavity. Then, the molten resin is cooled in the cavity, causing the resin to shrink. Therefore, an error that has taken place in the shape and dimensions of the product with respect to the dimensions of the cavity can be prevented and also excessive generation can be presented.

When the filling process is switched to the process, a delay of the switching timing will cause burrs on the product to be formed. On the contrary if the switching is performed prematurely, shrinkage or shortage takes place. Therefore, the switching operation must be performed at proper timing. Accordingly, a control method has been employed in which, as shown in FIG. 5, which the axis of abscissa stands for time t and the axis of ordinate stands for pressure P; the filling pressure realized by the hydraulic circuit in the filling process and in the packing process are detected; a rise in the hydraulic pressure which has taken place due to the completion of filling of the molten resin in the filling process is detected; and switching is performed when the hydraulic pressure has been raised to predetermined level P0.

A method has thus been employed in order to prevent erroneous switching to the packing control performed when the hydraulic pressure has been raised to the predetermined level P0 due to a temporary rise in the filling pressure caused by a disturbance in a state where filling of the cavity with the molten resin has not been complete. In this method, switching is performed when the hydraulic pressure has been raised to the predetermined level P0 after a predetermined time has passed from the commencement of the injection. Also, a zone control has been employed in which switching is performed when the hydraulic pressure is raised to the predetermined level P0 by detecting the filling pressure after the injection screw has moved forward to a predetermined position. Furthermore, there has been a control method in which the pressure of the injection of molten resin, the hydraulic pressure in the injection hydraulic circuit or the degree of opening between the fixed mold and the movable mold plate is detected so as to perform an adjustment operation in such a manner that the pressure in the packing process is corrected if the detected level exceeds a predetermined range (see, for example, Japanese Patent Publication No. 53-39905).

As described above, in the conventional control method in which the control is switched from the velocity control to the pressure control according to the filling pressure, switching is controlled by detecting a fact that the filling pressure or the like is raised to a predetermined level, and the hydraulic pressure is adjusted at the next injection molding operation if the pressure rises to an abnormal level. However, the conventional injection control has been too unsatisfactory to mass-produce precise products free from distortion by a reduction in the internal stress.

In a case where the zone control is employed, expert knowledge is required to set the zone range and the predetermined level P0 of the pressure, and what is worse, the preparation operations (such as, the initialization for the injection operation, become too complicated and too difficult because the predetermined level P0 becomes different according to the shape and the size of the mold cavity and the type of the resin.

OBJECT AND SUMMARY OF THE INVENTION

An object of the present invention is to overcome the aforementioned problems and to enable setting of the switching control to be performed easily and to easily mass-produce precise products.

According to the present invention, a determination is made that switching from filling velocity control is switched to packing control when an injecting screw or the like reaches a predetermined range of positions; the change in the screw filling velocity or the filling pressure immediately after switching has been performed is detected; the switching timing is hastened at the next injection if said velocity or pressure temporarily exceeds a target level at the time of the packing operation and the velocity change or the pressure change is reversed; and the switching timing is delayed if the velocity or the pressure does not reach the target level at the packing operation within a predetermined time after switching has been completed.

Since the present invention is arranged in such a manner that switching to the packing operation is performed and thus the packing operation is carried out when the injecting screw or the like reaches a predetermined position, the predetermined position can be calculated and determined easily by making the screw capacity between the rearward movement limit of the injecting screw or the like and the predetermined position for the same coincide with each other.

Furthermore, since the forward movement velocity of the injecting screw or the filling pressure or the like immediately after switching has been performed is detected and the next switching timing is hastened if the velocity change or the pressure change is reversed, the modification can be performed so that overshoot can be prevented. If the velocity or the pressure does not reach a target level within a predetermined time, the next switching timing is delayed so that modification is performed in such a manner that shortage can be prevented.

Other and further objects, features and advantages of the invention will become apparent from the following description along with the drawings.

DETAILED DESCRIPTION OF PREFERRED EMBODIMENTS

As an embodiment of the present invention, injection of an injection molding machine is controlled, wherein the injection molding machine has a screw-in-line type injecting device equipped with a magnet scale for detecting the position of an injecting screw.

Figure 2:
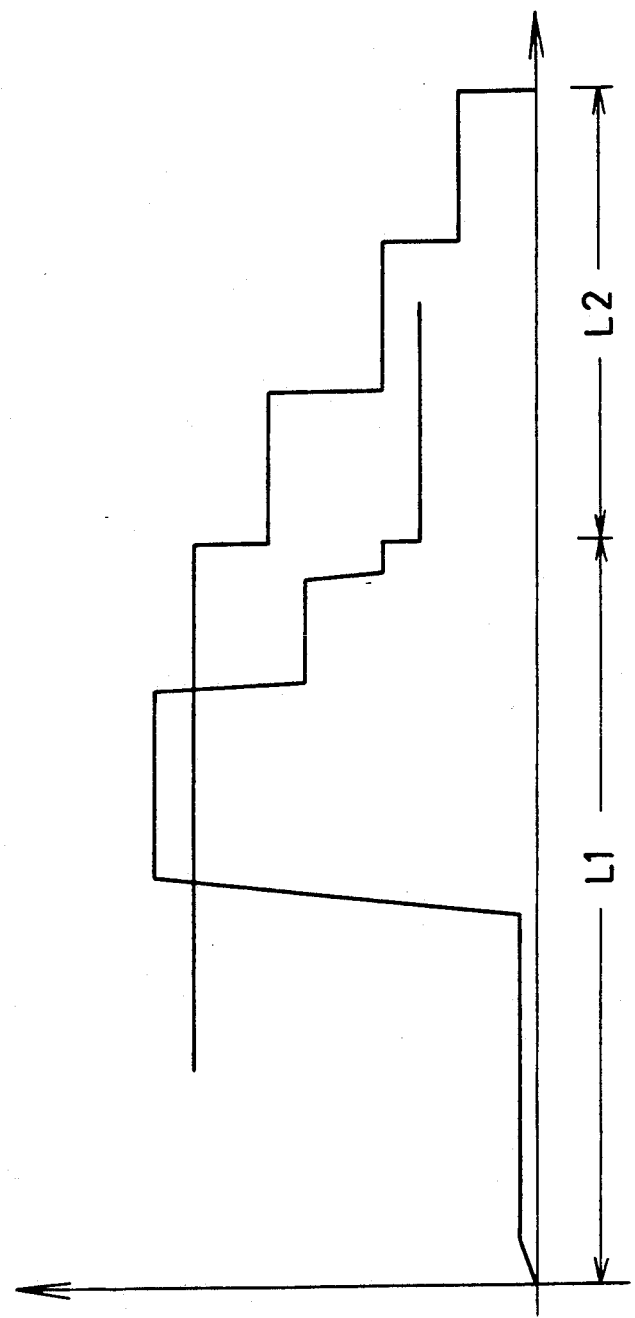
FIG. 2 is a graph which illustrates change in the injection velocity at the time of the commencement of a packing control in the injection molding method according to the present invention.

In the injection molding according to this control method, the rearward movement limit position of the injecting screw is determined according to the size of the cavity so that the required quantity of a molten resin is controlled. Furthermore, control of the degree of an opening of the pressure regulating valve and that of the flow rate adjustment valve are, as shown in FIG. 2, performed as follows: the degree of opening of the flow rate control valve is set according to the position of the injecting screw in order to change the injection velocity in the filling process L1, in which the cavity is filled with a molten resin, to several stages from the commencement of the injection according to the size or the shape of the cavity, or the type of the resin, or the injection temperature. After the injecting screw has reached the position at which the cavity is sufficiently filled with the molten resin, the degree of opening of the pressure regulating valve is adjusted and changed so as to be capable of adjusting the pressure in the packing process L2. At the time of the filling process and the packing process, the position of the injecting screw is adjusted, for example, in units of 0.1 mm; and the injection velocity is calculated by a control computer in order to detect the velocity of the injecting screw at the time of the injection molding.

The filling velocity at the time of the injection molding operation is composed of two velocity steps, that is, a low filling velocity which corresponds to the determined degree of opening of the aforesaid flow rate control valve and a high filling velocity which corresponds to the degree of opening of the valve set so as to be changed according to the shape of the cavity. After the cavity has been filled with the molten resin by a required quantity, the filling velocity is rapidly lowered, and the injecting screw is moved at a very slow velocity as designated by a curve A shown in FIG. 1, the axis of abscissa being the time base and the axis of ordinate being the forward movement velocity, wherein the injecting screw is moved at the very low velocity in order to supplement the quantity of the contraction caused from the fact that the molten resin in the cavity is cooled.

However, a fine deviation of the compression state of the molten resin or thermal expansion will results in case where the quantity of the molten resin to be injected into the cavity is insufficient by a slight degree or a case in which the cavity is undesirably filled with the molten resin before switching to the packing control is performed even if the control is changed to the packing control and the packing operation is commenced when the injecting screw has reached a predetermined position.

Figure 1:
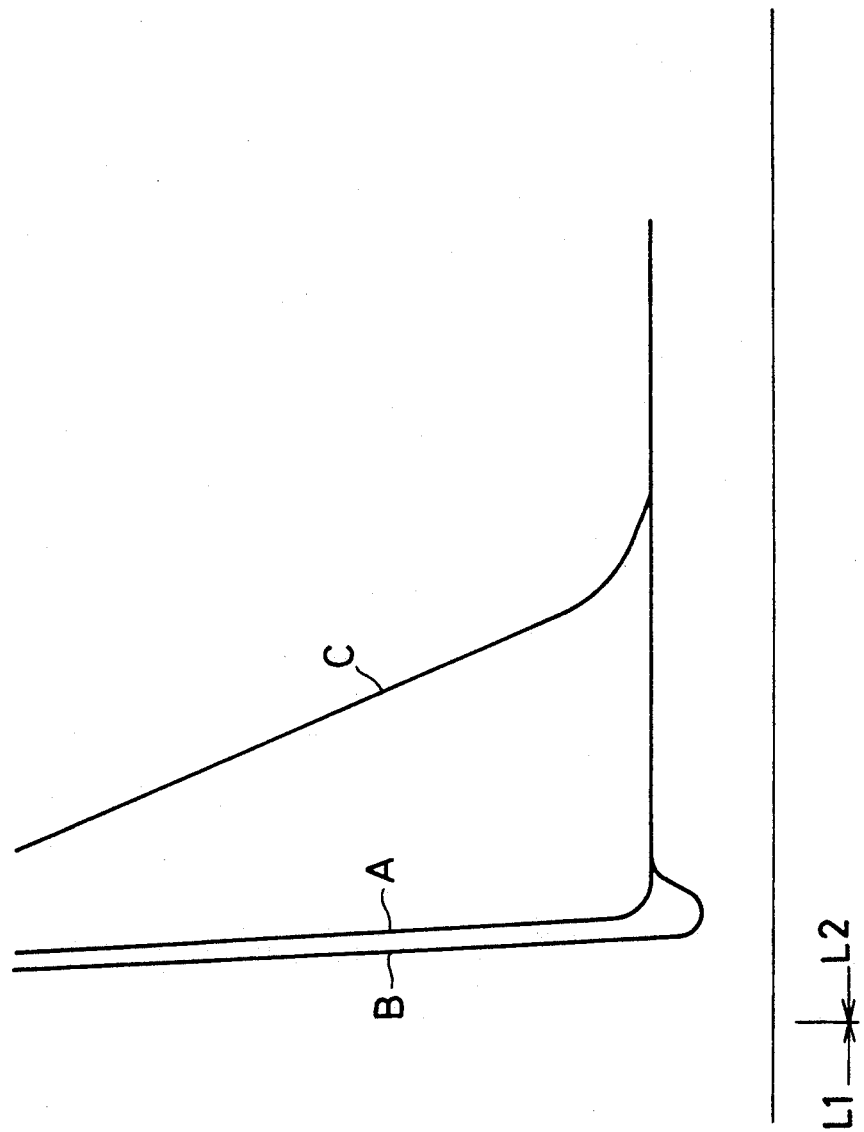
FIG. 1 is a graph which illustrates an example of the injection velocity in the injection molding method according to the present invention.

In the aforesaid case in which the quantity of the molten resin to be injected into the cavity is insufficient by a slight degree, the forward movement velocity of the injection screw after switching to the packing control has been performed becomes as designated by curve C shown in FIG. 1. As shown in FIG. 1, the injecting screw is moved forward so as to supplement the contraction of the molten resin due to cooling and the forward movement of the injecting screw performed for the purpose of supplementing the insufficient quantity of the molten resin is added to the aforesaid forward movement. Therefore, the forward movement velocity immediately after switching to commence the packing control has been performed becomes higher as compared with the curve A; and therefore, reaching and stabling at the very low velocity for the purpose of supplementing the contraction of the resin due to cooling is delayed. In the case where the cavity is filled with the molten resin immediately before switching to the packing control is performed, the molten resin is brought into an instantaneous excessively-compressed state, causing the forward movement velocity of the injecting screw to be lowered rapidly. The injecting screw is moved forwards at the very low velocity for the purpose of supplementing the contraction due to cooling after the molten resin has been returned to the proper state of compression. As designated by curve B shown in FIG. 1, the injecting velocity of the injecting screw is changed as follows: the velocity is rapidly lowered below a predetermined velocity, the velocity is temporarily raised, and the injecting screw is moved forwards at a constant velocity.

The predetermined forward-movement velocity in the packing process can be previously calculated depending upon the size of the cavity, the type of the resin, the cooling velocity, the diameter of the injecting screw or the like.

Therefore, according to this embodiment, the forward-movement velocity at the aforesaid packing process and the determined pressure level at the time switching from the filling process to the packing process are previously registered in the control computer as a determined level. If the pressure change takes places immediately after the velocity control is switched to the pressure control following the completion of filling as follows: if the velocity change is reversed midway in such a manner that the injecting velocity is temporarily lowered and then it is raised before the velocity becomes a predetermined velocity, (i.e., the determined velocity as designated by the curve B shown in FI. 1), the timing, at which the packing control is commenced by switching the pressure regulating valve and the flow rate control valve to the packing process, is hastened. The determined level of the switching position memorized by the control computer is modified so as to slightly shift the position of the injecting screw determined for performing switching to the packing process toward the rearward movement limit before the next injection is performed, or the determined level of the pressure for switching control memorized by the control computer is modified so as to be slightly lowered the pressure for switching control determined for performing switching to the packing process before the next injection is performed. On the other hand, in a case where the forward-movement velocity of the injecting screw is sequentially lowered to reach a predetermined velocity, and where no reversal has taken place in the detection of the velocity of the injecting immediately after switching to the packing process of the injection operation is performed, a discrimination is made on whether or not the velocity is raised to a predetermined velocity in a predetermined time. If the velocity is not raised to the predetermined velocity in the predetermined time, the timing at which the packing control is commenced is delayed. In order to delay it, the position of the injecting screw determined to performing switching to the packing process is slightly shifted toward the forward movement limit position or the determined level of the pressure for switching control memorized by the control computer is modified so as to be slightly raised the pressure for switching control determined for performing switching to the packing process before the next injection is performed. At the next injection, switching to the packing process is performed at the position at which the injection screw is moved slightly forwards toward the forward movement limit position from the aforesaid determined switching position.

According to the this embodiment, as described above, the reverse movement limit position for the injecting screw and the position of the injection screw at which the packing control is commenced are previously determined in accordance with the capacity of the cavity and they are registered in the control computer. Furthermore, the change in the velocity of the injecting screw takes place immediately after the packing control has been commenced. Therefore, if the injecting velocity is rapidly lowered temporarily below the determined velocity and it is reversed to be raised to the determined velocity, the position of the injecting screw, at which switching to the packing control is performed, is shifted toward the rearward movement limit position in order to prevent excessive filling. In the case where the change in the injection velocity immediately after the packing control has been commenced is moderate and the injection velocity is not therefore raised to the determined velocity within a predetermined time, the position of the injecting screw at which switching to the packing control is performed is shifted toward the forward movement limit position in order to prevent insufficient filling. Therefore, the moment, at which switching to the packing control is performed, can be significantly easily determined by converging it to the proper switching position. As a result, the switching control, which enables precise products to be mass-produced, can be easily performed.

The aforesaid reversal of the velocity is performed in such a manner that the velocity immediately after the packing control has been commenced is continuously detected; a newly detected level is subjected to a comparison with the previously detected level; and the reversal is detected when the newly detected level becomes larger than the previously detected level so that the reversal of the velocity can be detected easily.

Although the forward movement velocity of the injecting screw is detected so as to modify the moment at which the packing control is commenced in the aforesaid embodiment, the modification may be performed by detecting the pressure of the resin in the mold.

Figure 3:
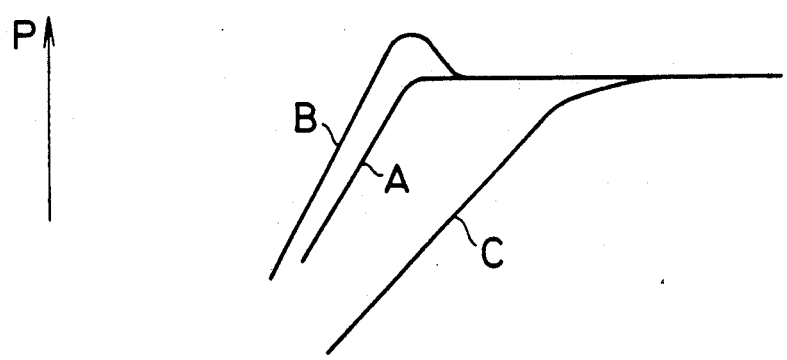
FIG. 3 is a graph which illustrates change in the pressure at the time of the commencement of the packing control in the injection molding method according to the present invention.
Figure 4:
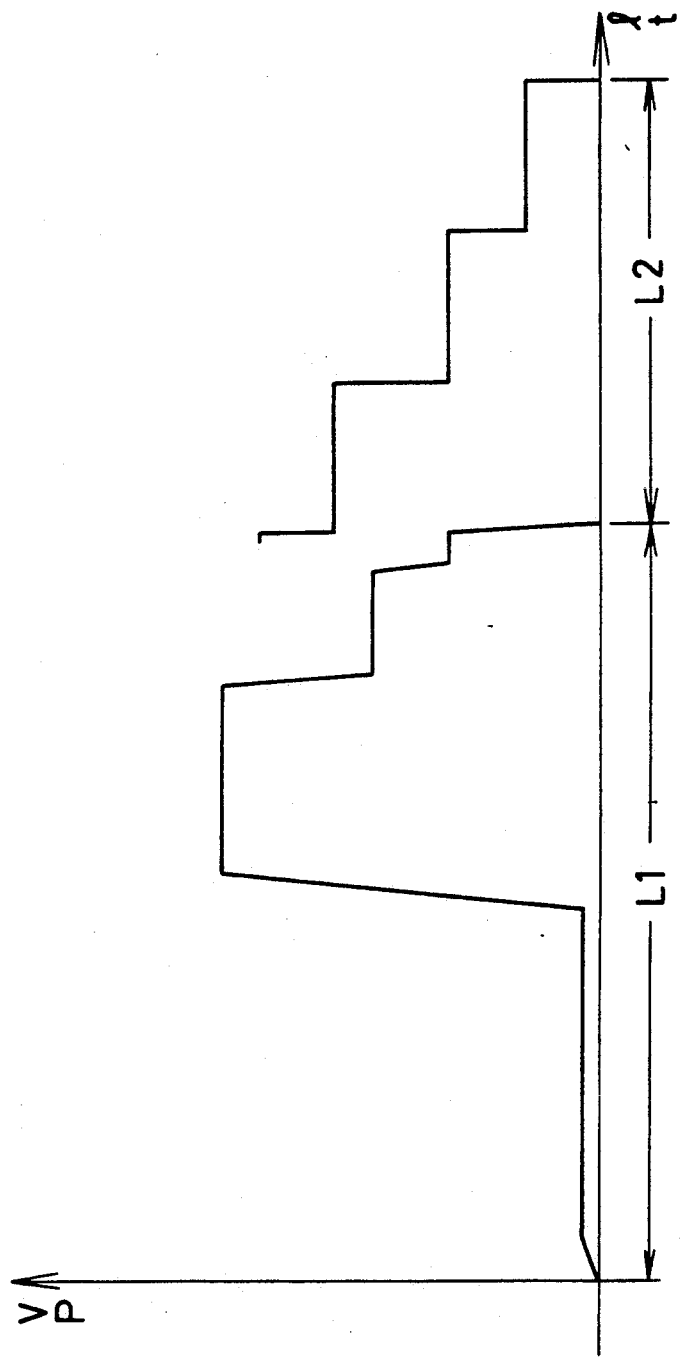
FIG. 4 is a graph which illustrates an example of the velocity control and the pressure control in the injection molding method.
Figure 5:
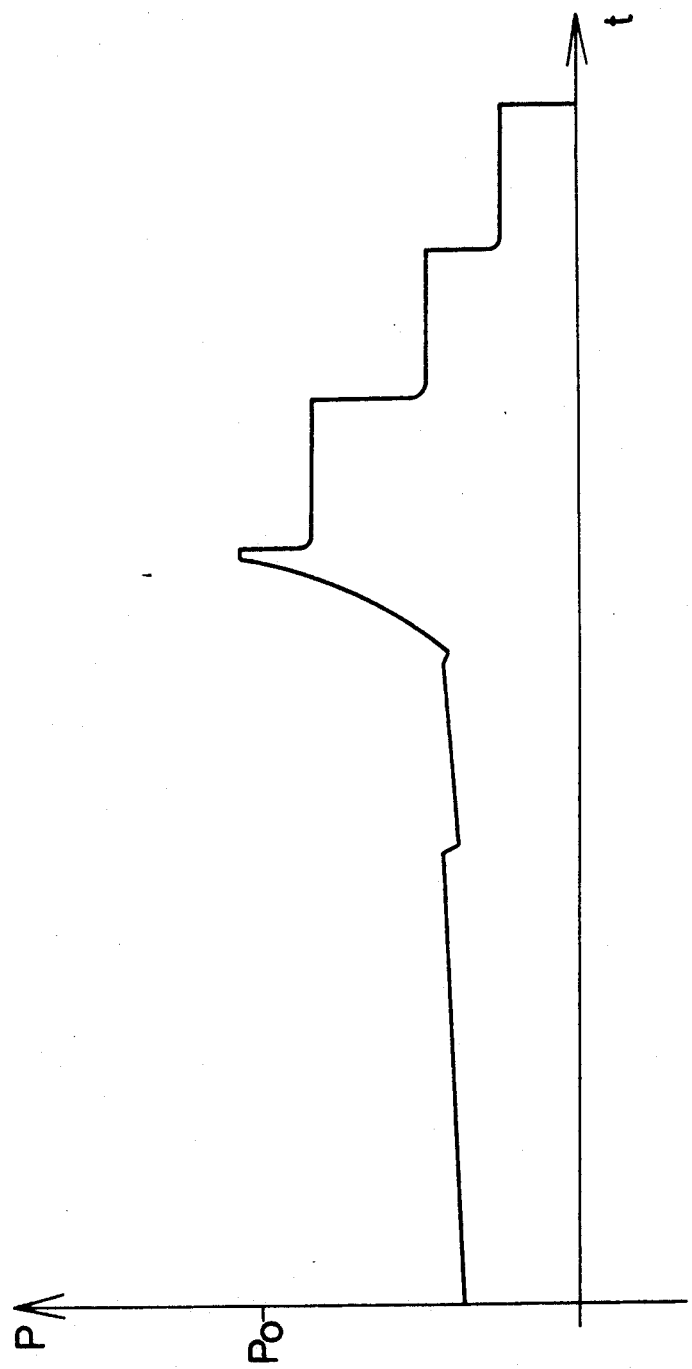
FIG. 5 is a graph which illustrates a conventional switching control.

As shown in FIG. 3, the axis of abscissa of which is the time base and the axis of ordinate of which stands for the pressure P, the pressure of the molten resin is made to be low before filling of the molten resin into the cavity is completed; and it is maintained at a predetermined level after the filling operation has been completed so that the molten resin is cooled and solidified. If a proper switching control is performed, the pressure of the molten resin smoothly reaches as designated by the curve A shown in FIG. 3. However, if switching to the packing control is performed prematurely, the pressure rise to the determined pressure delays as designated by the curve C shown in FIG. 3. If switching is delayed, a peak pressure exceeding the determined pressure is temporarily generated as designated by the curve B shown in FIG. 3.

According to the conventional method, the peak level of the peak pressure is detected. If the peak level is at abnormally high level exceeding the allowable level, the filling pressure, or the filling velocity, or the packing pressure is modified so as to prevent generation of the abnormally high pressure. However, according to, this embodiment, the change in the pressure that has taken place immediately after the packing control has been commenced is detected similarly to the aforesaid detection of the filling velocity. Furthermore, if the pressure is reversely lowered, the switching timing of the ensuing process is hastened If the pressure does not reach the determined level within a predetermined time from the commencement of the packing control due to the delay of rise of the pressure to the determined level, the switching timing of the ensuing process is delayed so that the switching from the filling velocity control to the packing control is controlled similarly to the aforementioned case where the change in the filling velocity is detected.

That is, in the injection control for the injection molding machine, the velocity control is switched to the pressure control when the injecting screw or the like reaches a position in a predetermined range. Furthermore, the pressure of the molten resin is detected by a pressure sensor disposed in the mold immediately after switching has been performed. If it is detected that the detected pressure of the resin is changed in such a manner that it temporarily exceeds the determined packing pressure and then it is converged to the determined packing pressure, the aforesaid position at which switching to the packing control is performed is modified to a position toward the rearward movement limit position at the next injection. If the pressure of the resin does not reach the determined packing pressure within a predetermined time from the commencement of the packing control, the position at which switching to the packing control is performed is modified to a position toward the forward movement limit position at the next injection.

The detection of the pressure of the molten resin is not limited to the case where it is measured in the mold. The pressure of resin injecting at the front end portion of the barrel or the like may be detected. When the pressure of the injecting resin is detected, the filling pressure of the resin may be indirectly detected by detecting the pressure of the oil under pressure to be supplied to the injecting cylinder so as to modify the timing at which the velocity control is switched to the packing control.

When the velocity control in the filling process is switched to the packing process by detecting the velocity or the pressure, the switching control may be performed in such a manner that the position at which switching is performed is determined according to the shape or the capacity of the cavity; the control pressure of the injecting screw at the determined switching position is detected; and the detected pressure level is made so as to be determined pressure at which switching from the velocity control to the pressure control is performed.

That is, in this case, the control method comprises the steps of: making a determination that injecting velocity control is switched to packing control when the injecting pressure at the time of the injection reaches a predetermined switching pressure or when an injecting screw or the like reaches an allowable range of control switching positions and as well as the injecting pressure reaches a predetermined switching level; detecting the screw filling velocity or the filling pressure immediately after the switching has been performed; performing a modification in such a manner that the determined switching pressure at which switching to the packing control is performed is lowered at the next injection if a reversal of the velocity change or pressure change is detected; and performing a modification in such a manner that the determined injection pressure at which switching to the packing control is performed is raised at the next injection if the velocity or pressure does not reach the determined level within a predetermined time from the commencement of the packing control.

Furthermore, a method according to each of the aforesaid embodiments may be similarly as employed in order to detect the change in the forward movement velocity of the injecting screw or the filling pressure at the time of performing switching from the filling process to the packing process, wherein the commencement of the packing control is hastened if the change in the velocity or the pressure is reversed and the commencement of the packing control is delayed if the level does not reach the determined level within a predetermined time from the commencement of the packing control.

That is, in this case, the control method comprises the steps of making a determination that injecting velocity control is switched to packing control when an injecting screw or the like reaches a determined switching position or when the injecting screw or the like reaches an allowable range of control switching positions and as well as control pressure reaches a predetermined switching level; detecting the screw filling velocity or the filling pressure immediately after the switching has been performed; performing a modification in such a manner that the determined switching position at which switching to the packing control is performed is shifted toward the rearward movement limit or the switching pressure is lowered if a reversal of the velocity change or pressure change is detected; and performing a modification in such a manner that the determined switching position at which switching to the packing control is performed is shifted toward the forward movement limit or the switching pressure is raised if the velocity or pressure does not reach the determined level within a predetermined time from the commencement of the packing control.

The aforesaid injection control is not limited to the screw-in line type injection apparatus. It can be applied to injection control in a variety of injecting machines having injecting apparatus.

In a case where the injection molding operation is performed in the same injection molding machine by again using a used mold, the optimum molding conditions when the used mold was used are usually recorded and it is considered that the position at which switching to the packing control may be determined so that the optimum molding conditions are realized. However, since the plasticizing conditions (that is, the temperature or the quantity of the supplied material) are changed and the characteristics of the material are slightly changed, observation of the state of the change in the injecting velocity or the injecting pressure at the time of performing switching to the packing control similarly to the aforesaid embodiment and changing the switching position according to the change in the injecting velocity or the injecting pressure will enable excellent products to be manufactured. This embodiment, of course, is advantageous when a new mold is used.

According to each of the aforesaid embodiments, the velocity control in the filling process is switched to the pressure control in the packing process in such a manner that the change in the injecting velocity or the injecting pressure is detected; switching is hastened if a reversal takes place in the velocity change or the pressure change immediately after switching to the packing control has been performed; and switching is delayed if the determined velocity of the pressure is not realized within a predetermined time from switching to the packing control. Therefore, the velocity control can be switched to the packing control at proper timing at which filling of the cavity with the molten resin has been completed. Therefore, the switching timing can be significantly easily be determined. Consequently, high quality products exhibiting good appearance, reduced warp, uniform weight distribution and excellent properties can be injection-molded.

While the invention has been particularly shown and described in reference to preferred embodiments thereof, it will be understood by those skilled in the art that changes in form and details may be made therein without departing from the spirit and scope of the invention.

What is claimed is:

1. A method of controlling an injection molding machine, comprising the steps of:
   determining that injecting velocity control is switched to packing control when an injecting screw reaches a determined position;

detecting one of the screw filling velocity and the filling pressure immediately after said injecting velocity control has been switched to said packing control;

detecting one of a screw filling velocity change and a screw filling pressure change;

modifying said determined position at which said switching to said packing control is performed toward a rearward limit position for said injecting screw at a next molding injection if a reversal of one of said screw filling velocity change and said screw filling pressure change is detected; and modifying said determined position at which said switching to said packing control is performed toward a forward limit position for said injecting screw at the next injection if one of said screw filling velocity and screw filling pressure does not reach a determined level within a predetermined time from the commencement of said packing control.

2. A method of controlling an injection molding machine, comprising the steps of:

determining that injecting velocity control is switched to packing control when one of an injecting pressure at the time of the injection reaches a predetermined switching pressure and an injecting screw reaches an allowable range of control switching positions and the injecting pressure reaches a predetermined switching level;

detecting one of the screw filling velocity and the filling pressure immediately after said injecting velocity control has been switched to said packing control;

detecting one of a screw filling velocity change and a screw filling pressure change;

performing a modification in such a manner that a determined switching pressure at which said switching to said packing control is performed is lowered at the next injection if a reversal of one of said screw filling velocity change and said screw filling pressure change is detected; and performing a modification in such a manner that said determined injection pressure at which said switching to said packing control is performed is raised at the next injection if one of said screw filling velocity and said screw filling pressure does not reach said determined level within a predetermined time from the commencement of said packing control.

3. A method of controlling an injection molding machine comprising the steps of:

making a determination that injecting velocity control is switched to packing control when said injecting screw reaches an allowable range of control switching positions and a control pressure for said injecting screw reaches a predetermined switching level;

detecting one of the screw filling velocity and the filling pressure immediately after said injecting velocity control has been switched to said packing control;

detecting one of a screw filling velocity change and a screw filling pressure change;

performing a modification in such a manner that (a) a determined switching position at which said switching to said packing control is performed is shifted toward the rearward limit position for said injecting screw at the next injection, and (b) a determined switching pressure is lowered at the next injection if a reversal of one of said screw filling velocity change and said screw filling pressure change is detected; and performing a modification in such a manner that (a) said determined switching position at which said switching to said packing control is performed is shifted toward the forward movement limit for said injecting screw, and (b) said switching pressure is raised if one of said screw filling velocity and said screw filling pressure does not reach said determined level within a predetermined time from the commencement of said packing control.

* * * * *